Sept. 27, 1938.  G. W. HULL  2,131,324
SOIL WORKING IMPLEMENT
Filed Sept. 28, 1936  2 Sheets-Sheet 1
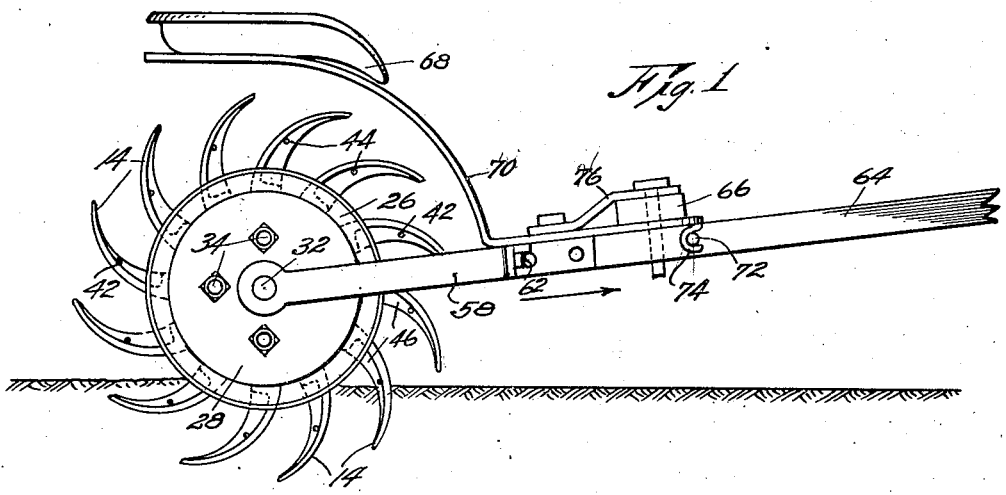
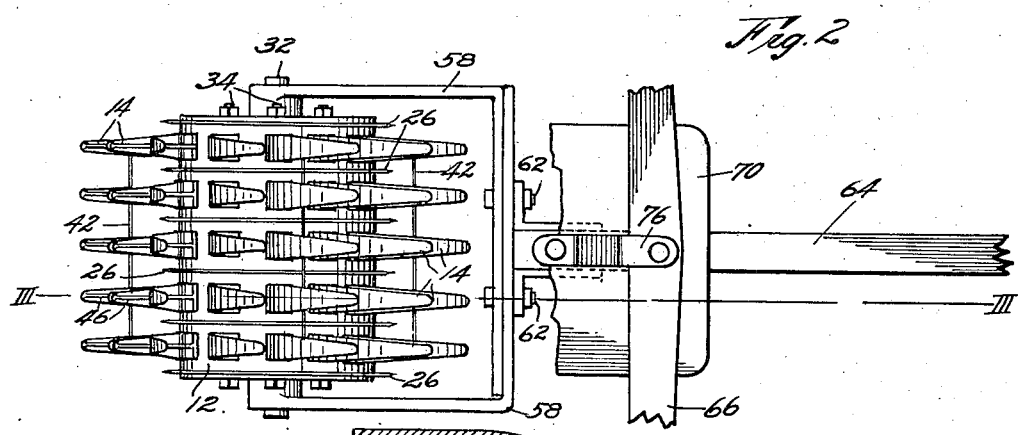
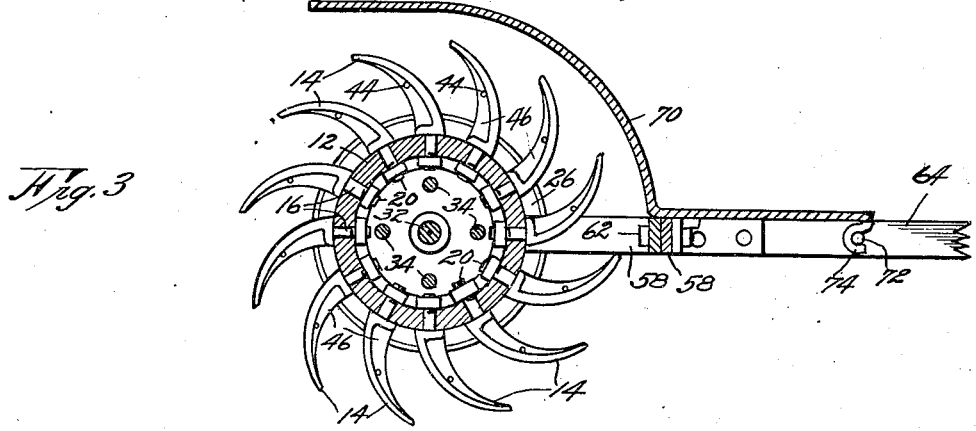
INVENTOR,
George W. Hull.
BY
Hovey & Hamilton
ATTORNEYS.

Sept. 27, 1938. G. W. HULL 2,131,324
SOIL WORKING IMPLEMENT
Filed Sept. 28, 1936 2 Sheets—Sheet 2
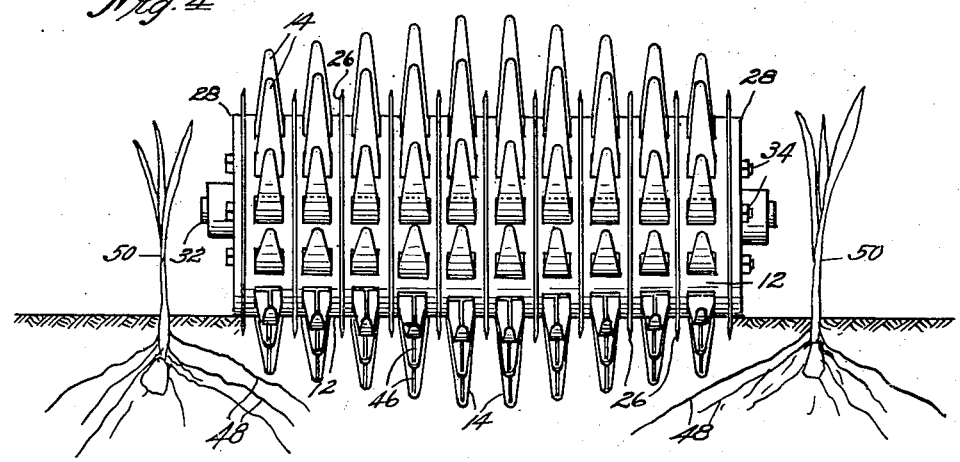
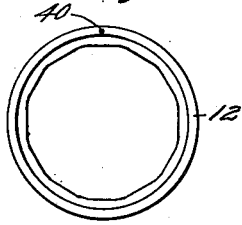
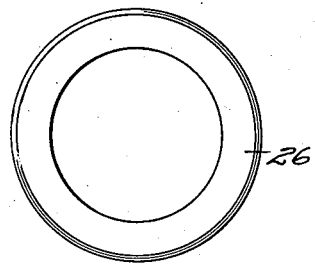
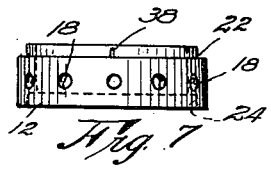
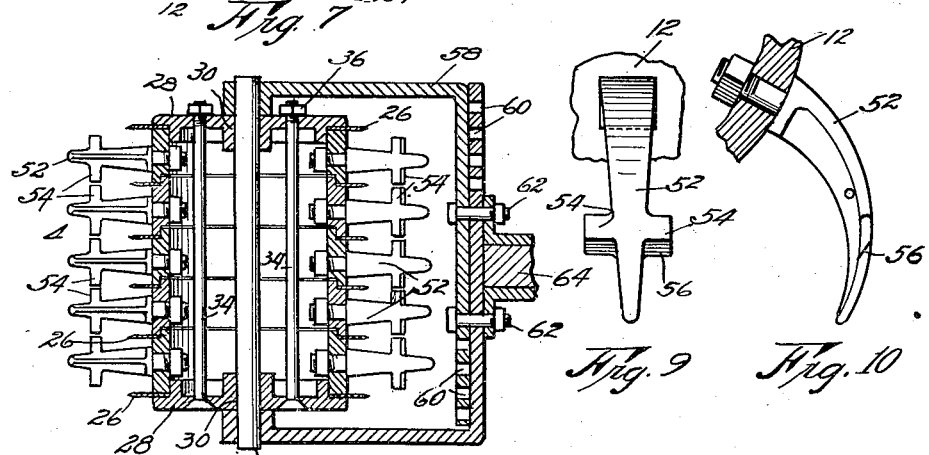
INVENTOR,
George W. Hull.
BY
Hovey & Hamilton,
ATTORNEYS Patented Sept. 27, 1938

2,131,324

UNITED STATES PATENT OFFICE 2,131,324

SOIL WORKING IMPLEMENT

George W. Hull, Kansas City, Kans.

Application September 28, 1936, Serial No. 102,927

10 Claims. (Cl. 97—52)

This invention relates to agricultural implements and particularly soil working equipment of the nature usable in preparing the seed beds and in cultivating during growth of the crop.

The primary object of this invention is to provide a soil working implement of the aforementioned character, which has a body comprising a number of units arranged in side-by-side relation, to the end that the width may be adjusted and new units positioned without an appreciable amount of labor and with ease and dispatch.

Another important object of this invention is to provide a soil working implement of the aforementioned character, which has a part thereof, a plurality of sets of teeth arranged in spaced-apart, circumscribing paths, and with cutting discs disposed therebetween so that a complete stirring and breaking up of the soil will take place as the implement passes over the ground.

A yet further aim of the instant invention is the provision of an agricultural implement which has a number of arcuate teeth arranged in circumscribing paths about an axis and upon a supporting drum, whereby the teeth will penetrate the soil in a direction along a vertical line and will leave the soil in such positions with respect to the face of the supporting drum as to carry upwardly a quantity of the soil so that a turning and stirring effect is accomplished.

A still further object of this invention is to provide in a soil working implement, the combination of a number of specially formed teeth arranged in a particular fashion upon supporting elements, so that upon pulling the implement in one direction, the teeth will effectively penetrate the soil, yet when pulled in the opposite direction, the teeth will serve as supporting members with smooth surfaces thereof bearing against the ground in a way which will prevent their penetrating action.

Minor objects of the invention will appear during the course of the following specification, referring to the accompanying drawings, wherein:

Figure 1 is a side elevation of a soil working implement made in accordance with the present invention.

Fig. 2 is a top plan view of the same.

Fig. 3 is a vertical, sectional view through the implement, taken on line III—III of Fig. 2.

Fig. 4 is a front view of the implement provided with teeth of various lengths.

Fig. 5 is a horizontal, sectional view through the implement, which has been provided with specially formed teeth.

Fig. 6 is a side elevation of one of the supporting rings entirely removed from association with the remaining parts of the implement.

Fig. 7 is an edge view of the said ring.

Fig. 8 is a side elevation of one of the cutting discs entirely removed from the implement.

Fig. 9 is an enlarged, detailed, side view of one of the teeth illustrated in Fig. 5, and, Fig. 10 is an edge elevation of the tooth illustrated in Fig. 9.

The completely assembled implement is shown in Figs. 1 and 2. The body of the implement comprises a plurality of rings 12, arranged in side-by-side relation, and each carrying a plurality of substantially radially extending teeth 14, each longitudinally arched and anchored at one end directly to the appropriate ring 12.

The unit which comprises ring 12 and teeth 14 may be made up in its entirety prior to its association with the remaining units of the implement body, and when the implement is assembled, its width is determined by the number of units used. Each of teeth 14 has a neck 16 extending through one of openings 18 provided in ring 12. Neck 16 is screwthreaded and engaged by a nut 20, and the inner annular surface of ring 12, against which nuts 20 must bear, is preferably made to present a number of planar faces so that adjustment of nuts 20 will not be retarded by the edges thereof cutting into the inner surface of ring 12.

Rings 12 are interchangeable and one edge of each has an external shoulder 22 thereon, while the other edge has an internal shoulder 24, all to the end that adjacent rings 12 may be interlocked to prevent radial displacement. A number of cutting discs 26 are included in the body of the implement, and for best results, should be interposed between each ring 12. The diameter of these discs 12 is less than the diameter of the annular path upon which is disposed the ends of teeth 14 so that in working the soil, teeth 14 are primarily the elements acting thereon. It is only after teeth 14 penetrate the soil for the major portion of their length that discs 26 come into contact with the soil.

Figure 8 readily illustrates that each disc 26 is substantially ring-shaped so that they may be slipped over the external shoulder 22 to be held in place by two adjoining rings 12. It is also desirable to provide a ring 26 at the end of the body of the implement between the end rings 12 and heads 28. These heads are each provided with a bearing 30 which journals shaft 32, and tie rods 34 interconnect heads 28 so that a rigid unit is provided when nuts 36 on tie rods 34 are tightened. There may be four or more tie rods 34 extending longitudinally through the body of the implement and transversely through rings 12. If desired, an outwardly extending pin 38 may be placed at one edge of each ring 12 to enter a socket 40 created in the adjoining edge of the abutting ring.

Wires 42 may be stretched through openings 44 formed in the back fin 46 of each tooth 14 for the purpose of severing or drawing to the surface such vegetation as might be in the field when the implement is used. These wires 42 may be stretched between each longitudinal row of teeth or across selected rows, depending upon the number necessary to accomplish the desired results.

The preferred embodiment of the invention as regards the form of teeth 14 is illustrated in Figs. 1, 2, 3 and 4. In Fig. 4 the teeth at the central portion of the body of the implement are much longer than those at the ends thereof, and advantages of such an assembly of teeth of various lengths is graphically illustrated. In cultivating corn, for example, the soil close to roots 48 of the plant 50 should not be so deeply stirred as the soil along a line intermediate or further removed from plants 50, and since teeth 14 penetrate the soil their entire length, a body such as illustrated in Fig. 4 is effective and desirable when cultivating certain types of crops.

The form of teeth 52 illustrated in Figs. 5, 9 and 10 is somewhat different than those illustrated in the other views. The principal difference lies in the provision of laterally extending ears 54, each of which has a sharpened edge 56 directed toward the outermost point of the tooth. Supporting rings 12 and the manner of anchoring one end of the tooth to the said rings remain the same.

The manner of connecting the implement to a source of power is herein illustrated to be an adjustable yoke 58, made up of two similar, overlapping parts, each provided with a series of holes 60, through which may pass bolts 62 when the parts of yoke 58 have been moved into engagement with shaft 32, as illustrated in Figs. 2 and 5. As more units or rings 12 are added to the body of the implement, a longer shaft 32 is employed and yoke 58 is expanded to accommodate the additional overall length. The usual tongue 64, with double tree arrangement 66, is affixed to yoke 58, and seat 68 is mounted upon tongue 64 in an unique manner by specially formed bracket 70. A cross pin 72, extending through tongue 64, is engaged by hook 74 formed on bracket 70. This hook 74 is at the outer end of bracket 70 and the portion thereof lying against tongue 64 and yoke 58 combines with hook 74 in holding seat 68 in place above the body of the implement. There should be two of these hooks 74 to prevent tilting and the double tree 66, with its supporting clevis 76, overlies the portion of bracket 70. The implement is shown with seat 68 mounted thereon in a manner so as to work the soil when force is exerted to pull the implement in a direction indicated by the arrow in Fig. 1. In so pulling the implement, the end of each tooth 14 will penetrate the soil along a substantially vertical line. The outer annular faces of rings 12 will bear against the surface of the soil, and as teeth 14 are withdrawn or moved upwardly, the ends thereof will leave the surface before the intermediate portions of the teeth so that a small amount of soil is actually lifted and allowed to drop back as the implement travels forwardly.

When going to or from the field of work, the implement may be rendered inoperative by merely reversing the positions of tongue 64 and seat 68. Removal of seat 68 may be quickly accomplished, after which tongue 64 is swung to the other side of the body of the implement about the axis of shaft 32. Such reversal will not effect the relation between tongue 64, pin 72 and hooks 74. The clevis 76 and double tree 66 may also be placed back in the same relation to the tongue 64 and bracket 70 as they were when the tongue was in the position on the other side of the body. Thus, when the direction of rotation of teeth and rings 14 and 12 respectively are reversed, the convex side of teeth 14 will engage the surface in a manner which will preclude their penetration and, therefore, render the implement inoperative as a soil working device.

It is conceivable that a large number of implements having physical characteristics different from those illustrated and described might be made and effectively employed without departing from the concepts of the invention or scope of the appended claims.

Having thus described the invention, what is claimed as new and desired to be secured by Letters Patent is:

1. An implement of the character described comprising, a plurality of sets of teeth arranged in spaced-apart circumscribing paths; and discs beside the said sets of teeth, each having a continuous cutting edge disposed in a circumscribing path spaced inwardly from the ends of the teeth; and transverse wires carried by said teeth intermediate the ends of said teeth and said discs.

2. An implement of the character described comprising a plurality of sets of teeth arranged in spaced-apart parallel circumscribing paths; and discs intermediate each of said sets of teeth each having a continuous cutting edge disposed in a circumscribing path spaced inwardly from the ends of the teeth, said teeth being longitudinally arched to cause the ends of the same to enter the soil in a substantially vertical direction when the teeth are caused to travel in one direction along their circumscribing paths.

3. An implement of the character described comprising a plurality of sets of teeth arranged in spaced-apart, parallel, circumscribing paths; and wires carried by the teeth, said wires being perpendicular to and extending through the circumscribing paths intermediate the ends of the teeth.

4. An implement of the character described comprising a plurality of circumscribing units arranged in side-by-side contact relation, each having soil-penetrating arcuate tooth members thereon; tie rods for securing together said units; a shaft rotatably supporting the units; and an adjustable member, journalling the shaft, for receiving motivating power.

5. An implement of the character described comprising a plurality of circumscribing units arranged in side-by-side relation, each having soil-penetrating members thereon; a plate having a bearing thereon at each end respectively of the plurality of units; tie rods extending through the plates for drawing the same against the units; a shaft journalled in said bearings and projecting outwardly beyond the plates; and an adjustable yoke carried by the shaft.

6. An implement of the character described comprising a plurality of circumscribing units arranged in side-by-side relation, each having soil-penetrating members thereon; a plate having a bearing thereon at each end respectively of the plurality of units; tie rods extending through the plates for drawing the same against the units;

a shaft journalled in said bearings and projecting outwardly beyond the plates; and an adjustable yoke carried by the shaft, said units having cutting discs secured therebetween.

7. An implement of the character described comprising a plurality of circumscribing units arranged in side-by-side relation, each having soil-penetrating members thereon; a plate having a bearing thereon at each end respectively of the plurality of units; tie rods extending through the plates for drawing the same against the units; a shaft journalled in said bearings and projecting outwardly beyond the plates; and an adjustable yoke carried by the shaft, said units having cutting discs secured therebetween and wires extending transversely of the said discs between the annular edges thereof and the ends of said soil-penetrating members.

8. An implement of the character described comprising a plurality of circumscribing units arranged in side-by-side relation, each having soil-penetrating members thereon; a plate having a bearing thereon at each end respectively of the plurality of units; tie rods extending through the plates for drawing the same against the units; a shaft journalled in said bearings and projecting outwardly beyond the plates; and an adjustable yoke carried by the shaft, said units having interengaging, offset, abutting edges to preclude lateral displacement thereof.

9. An implement of the character described comprising a plurality of units arranged in side-by-side relation; tie rods for securing together said units; and a shaft rotatably supporting the units for bodily movement about a common axis, each of said units comprising a ring, and a series of radially extending teeth removably secured to the ring.

10. An implement of the character described comprising a group of circumscribing units arranged in side-by-side relation, each having soil-penetrating teeth thereon; a shaft rotatably supporting the units for simultaneous movement about a common axis; and means for securing the implement to a source of power, the teeth on the central unit of the group being longer than the teeth on any other unit, the teeth of the units on each side of the central unit progressively decreasing in length as the outermost units are approached, and to emerge therefrom vertically ahead of the body portion of the respective teeth.

GEORGE W. HULL.